July 18, 1950 G. E. MORRIS 2,515,251
FLUID FLOW DIRECTION INDICATOR
Filed June 30, 1948 2 Sheets-Sheet 1
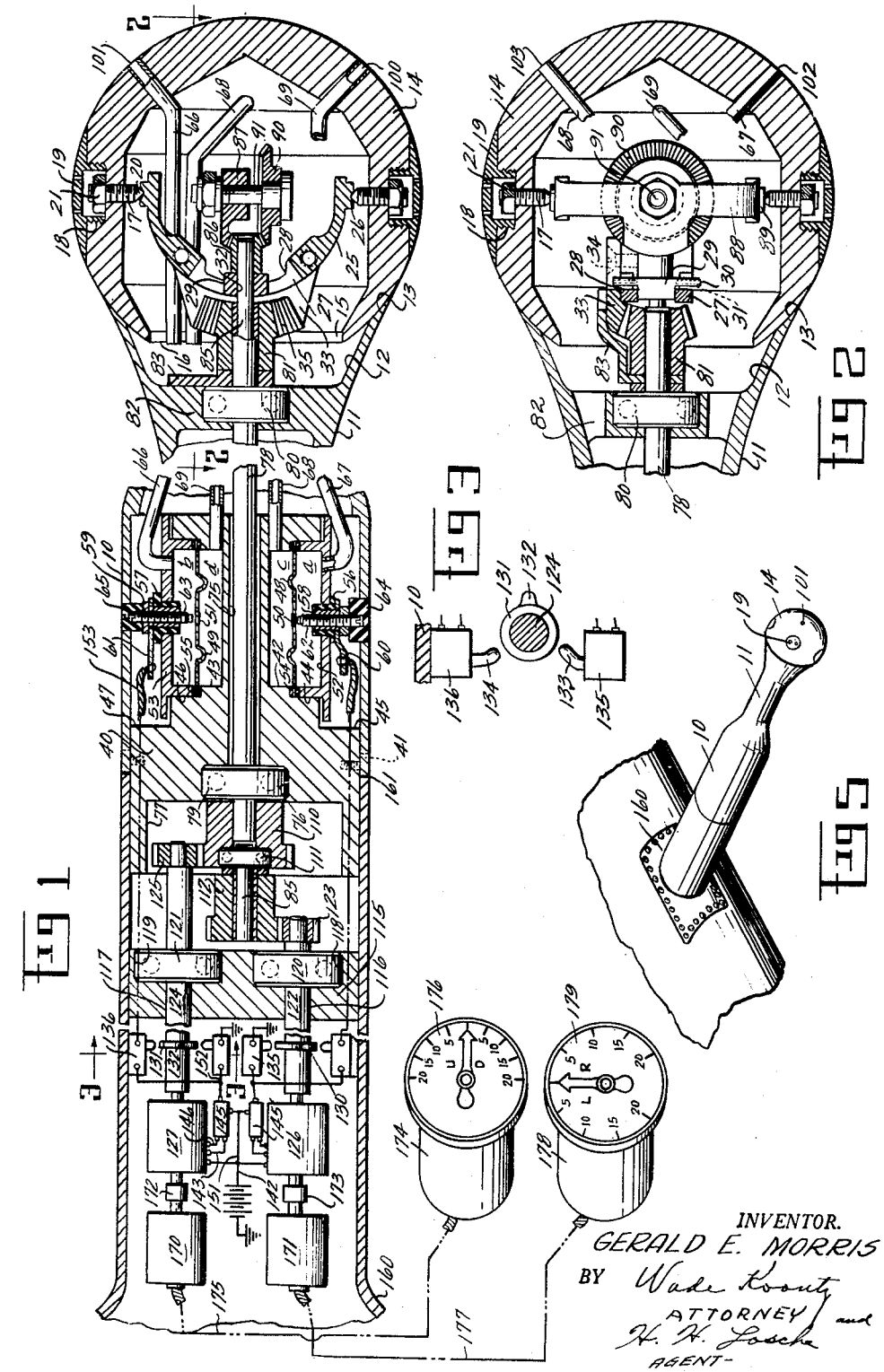
INVENTOR.
GERALD E. MORRIS
BY Wade Koontz
ATTORNEY
H. H. Losche
AGENT

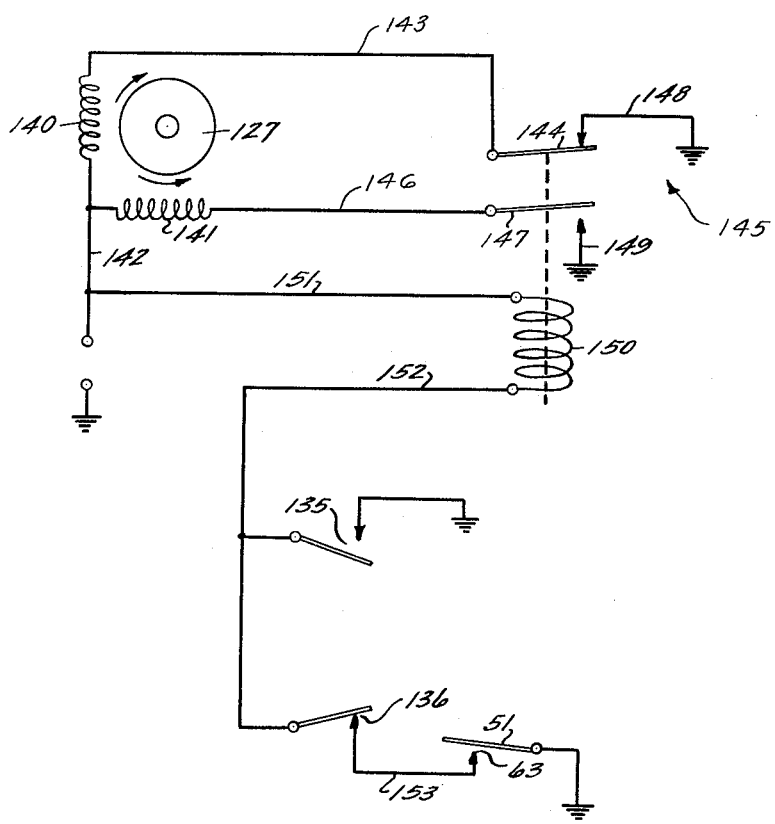

Patented July 18, 1950

2,515,251

UNITED STATES PATENT OFFICE 2,515,251

FLUID FLOW DIRECTION INDICATOR

Gerald E. Morris, Tipp City, Ohio

Application June 30, 1948, Serial No. 36,051

8 Claims. (Cl. 73—180)

(Granted under the act of March 3, 1883, as amended April 30, 1928; 370 O. G. 757)

The invention described herein may be manufactured and used by or for the Government for governmental purposes without payment to me of any royalty thereon.

This invention relates to pitch and yaw indicators and more particularly to the fluid flow null type that provides continuous angular indications of pitch and yaw with respect to the air stream.

Fluid flow direction indicators have many uses, the most extensive use probably being for aircraft. Heretofore, the pitch indicator and the yaw indicator each constituted separate and individual instruments, or, where one instrument was used, a rather complicated switching mechanism was used to adapt the device for either pitch or yaw indications. These devices which provided alternative pitch or yaw indications had the disadvantage of not providing both pitch and yaw indications simultaneously which often times is a necessity in the navigation and piloting of mobile vehicles and particularly of aircraft.

The present invention provides a single instrument which gives indications of pitch and yaw continuously and simultaneously. To accomplish this, a pressure responsive device is subjected to the air stream that is responsive to pressure sense in both the vertical and horizontal planes with respect to the carrying vehicle to actuate pitch and yaw indicators simultaneously with mechanisms to maintain the differential pressures in the pressure responsive device in the null condition. The preferred arrangement in carrying out this means of indication is in the use of a hollow sensing head that is universally mounted on a support member that is adapted to be attached to a vehicle of use, as an aircraft, such that the sensing head can be rotated for a limited distance about either of two axes oriented normal to each other. Two pairs of air pick-off ports are arranged concentrically about an axis of symmetry through the sensing head that is normal to the two above mentioned axes, each pair of ports being in communication with a differential pressure responsive diaphragm switch. One pair of ports and related switch are responsive to the air stream for angles of pitch; while the other pair of ports and related switch are responsive to the air stream for the angles of yaw. The pitch and yaw differential diaphragm switches are each in a circuit associated with a control motor that operates to maintain the corresponding pair of pitch or yaw air ports in equal pressure relation and any rotation of the sensing head from a predetermined basic position is indicated through a self-synchronous motor-receiver coupling to indicators desirably placed. In this manner, the predetermined basic position can be fixed with respect to the vehicle carrying the device wherein relative angles of pitch and yaw with respect to the air stream may be registered.

It is a primary object of this invention to provide a fluid flow responsive indicating device for continuously and simultaneously registering angles of pitch and yaw with respect to the air stream upon being moved through the atmosphere.

It is another object of this invention to provide a single differential pressure null position sensing device having a hollow sensing head universally mounted on a support by two members within the sensing head each being journaled to the sensing head on an axis normal to each other and to an axis of symmetry of the sensing head, one member being rotatively held to the support by a driving element of the other member, and a driving element to rotate the one member such that actuation of the driving elements produces a cone of rotation of the sensing head axis of symmetry with respect to its support.

It is a further object of this invention to provide a pitch and yaw sensing device having a head member controllable in each of two normally arranged axes that are positioned substantially transversely to a longitudinal center line of the device with two pairs of pressure ports in the sensing head member arranged in two planes corresponding to the two axes that transmit the pressure sense to corresponding pairs of differential pressure responsive switches capable of controlling power means operable to maintain the head member in position about both axes to establish substantially equal pressure in the respective pressure ports.

Still another object of this invention is to provide a device to continuously and simultaneously register pitch and yaw angulation in which a sensing head member is universally mounted on one end of a support by pivotal means on axes that are normal to each other and swingable through arcs substantially normal to a longitudinal center line of the support by electric motor means, each motor being operative to control the head member rotation about one each of its axes in response to corresponding differential pressure responsive switches that are controlled by differential pressures impressed thereon from air ports positions in pairs in the head member symmetrically in two planes from a diametrical axis of symmetry normal to the sensing head rotatable axes, each pair of air ports corresponding to the differential pressure responsive switch which controls the electric motor for maintaining equal pressures in the related air ports, and self-synchronous motor-receiver means interconnecting the sensing head for each axis of rotation to position remote indicating means such that the deviation of the axis of symmetry of the sensing head with respect to the longitudinal center line of the support will be registered on pitch and yaw indicating means to provide a constant reference of the pitch and yaw of the device with respect to the air stream.

These and other objects will become more apparent as the description proceeds when taken along with the accompanying drawings, in which;

Fig. 1 is a longitudinal sectional view of the indicating device with parts shown diagrammatically for convenience of illustration;

Fig. 2 shows a partial sectional view of the indicator head and support taken on the line 2—2 of Fig. 1;

Fig. 3 is an elevational view of one set of limit switches and related parts taken on the line 3—3 of Fig. 1 and looking in the direction of the arrows;

Fig. 4 is a schematic wiring diagram of one of the motor circuits; and

Fig. 5 is an isometric view of the sensing device as attached to an airplane wing.

Referring more particularly to Figs. 1 and 2, a tubular support 10 is arranged on the left end to be mounted on a front portion of a vehicle (not shown) which, for the purpose of illustration, let it be assumed to be an aircraft although the device may find uses on other types of vehicles. The forward end of the tubular support or boom 10 is reduced to form a neck portion 11 that flares outwardly in a mouth portion 12 which provides a spherically contoured seat 13. Rotatably held on the seat 13 is a hollow spherical segment 14 having an opening 15 into the interior at the plane 16 of the segment which opening is directed backwardly into the interior of the tubular support 10. On opposite sides of the sphere, lying on a diameter at right angles to a diameter passing centrally through the plane 16, which for the purpose of simplicity will hereinafter be referred to as the sphere axis of symmetry, are set screws 17 threaded through the sphere wall, the outer ends of which are recessed in a threaded bore 18 closed by caps 19 having an external spherical surface to provide an unbroken spherical surface of the spherical segment 14. The inner ends of the set screws 17 are pointed at 20 and the outer ends have jamb nuts 21 threaded thereon to lock the set screws 17 in position.

Within the sphere and pivoted on the set screws 17 is a semicircular member 25 having conical bearing sockets 26 in which the pointed portions 20 of the set screws rest. The middle portion of the semicircular member 25 is divided at 27 forming two connecting portions having smooth bearing surfaces 28. A bearing block 29 is positioned in the divided portion 27 and has lateral bearing extensions 30 thereon supporting hardened bearing elements 31 that are engageable with the bearing surfaces 28 of the semicircular member 25. The bearing elements 31 may be rotatably supported in the bearing block, if desired, to reduce friction in the relative movement of the parts. The bearing block 29 has a machined opening 32 to receive a shaft for the purpose later to be described. Mounted to one side of the semicircular member 25 is a sector gear 33 as by screws 34, or other well known means, the teeth 35 of which have their center of curvature at the center of the hollow sphere 14.

Within the tubular support 10 is slidably fitted a cylindrical block 40 that may be retained therein by screws 41. The forward end of the block 40 has opposed bores 42 and 43, and corresponding counter bores 44, 45 and 46, 47. On each of the shoulders formed by the bores 42, 44 and the bores 43, 46 is a flexible metal diaphragm 48, 49 having a central contact element 50, 51. Each counter bore 44, 46 is threaded to receive a threaded cap 52, 53 that securely holds the respective diaphragm in place. The diaphragms are sealed against leakage by corresponding sealing rings 54 and 55 yet each diaphragm is in metal contact with the block 40. Centrally of each cap 52, 53 is an electric installation sleeve 56, 57 threaded therethrough and having a central threaded opening to receive a metal bushing 58, 59, respectively, the outer end of which is flanged outwardly to secure respectively a terminal plate 60, 61 against the corresponding insulating sleeve 56, 57. Threaded through each bushing 58, 59 is a contact element 62, 63 that extends outwardly a sufficient amount to accommodate a closure cap 64, 65 respectively, threaded thereon as a locking nut. The outer end of each cap 64, 65 extends through an opening in the tubular support 10 flush with the outer surface thereof and has a slot therein to receive a tool, as a screw driver or the like, for the purpose of removing the caps to adjust the clearance between contacts 50, 62 and 51, 63. Each cap has an opening therethrough communicating with the chamber formed between the respective cap and diaphragm which, for the purpose of reference, are designated as chambers a and b, respectively. In each of these openings is a tube 66, 67 which extend forward for connection to pressure ports, later to be described. The innermost chambers, designated as c and d, each has a wall opening through which respective tubes 68, 69 extend for connection to pressure ports to be described.

The block 40 is centrally bored at 75 and counter bored on the back end at 76 and 77. Concentric shafts pass through the bore 75 and the neck portion 11 of the tubular support 10 to the forward end thereof, the outer shaft 78 being supported in roller type bearings 79 and 80 and having a pinion gear 81 fixed to the forward end thereof to mesh with the sector gear 33. The roller type bearing 79 is supported in the counter bore 76 of the block 40 while the roller type bearing 80 is supported in a recess in a spider 82 formed near the mouth portion 12 of the tubular support 10. A bracket 83 shields the pinion and sector gears 81, 33 as well as retains the bearing 80 in place. The inner shaft 85 is journaled in the bearing block 29 and has a pinion gear 86 on the forward end thereof that meshes with a sector gear 87 which sector gear is integral with a bracket 88 that has bearing portions 89 that are pivotally journaled on the inner wall of the spherical head 14 at diametrically opposed points 90 degrees from the pivotal points 20, 26 in the same manner and of the same construction as pivots 20, 26. An idler gear 90 is supported on the sector gear 87 and bracket 88 by a bolt 91. Rotation of pinion gear 81 imparts clockwise and counterclockwise rotation (as viewed in Fig. 1) to the spherical head by the rotation transmitted through the semicircular member 25 on pivots 20, 26 causing the sphere to rotate about the pivots 89 of the bracket 88. Rotation of the pinion gear 86 would cause rotation of the spherical head 14 about the pivotal points 20, 26. It may be seen from the above description that the spherical head 14 may be rotated by the two pinion gears 81 and 86 such that the sphere axis of symmetry may be directed throughout a cone mechanically limited to about 20 degrees of arc from the longitudinal center line of the tubular support.

Corresponding to each axis of rotation of the spherical head 14 are two pairs of pressure ports symmetrically arranged about the sphere axis of symmetry. Pressure ports 100, 101, which correspond to the axis of sphere rotation about the pivotal points 89 and lie in a plane parallel with the plane of the pivotal points 20 and normal to the plane of the pivotal points 89, are connected by the flexible conduits 69, 66 to the chambers d and b of the switch 51, 63. The conduits 67, 68 connect the other pair of ports 102, 103, corresponding to the sphere axis of rotation about the pivotal points 20, 26, to the chambers a and c.

The back end of the tubular shaft 78 has a pinion gear 110 secured thereto. The back end of the pinion gear 110 is recessed to receive a roller type bearing 111 through which the shaft 85 extends and on which is affixed a pinion gear 112. Positioned behind the block 40 in the tubular support 10 is a second block 115 having two eccentric bores 116 and 117 and corresponding counter bores 118 and 119. The counter bore 118 retains a roller type bearing 120 while the counter bore 119 receives a roller type bearing 121. Through the bore 116 and bearing 120 is a shaft 122 having the forward end reduced to receive and retain a pinion gear 123 that is in mesh with the pinion gear 112. A shaft 124 extends through the bore 117 and the roller bearing 121 and has the forward end reduced to receive and retain a pinion gear 125 that is in mesh with the pinion gear 110. Connected to each shaft 122 and 124 is a reversible type drive motor 126, 127, respectively, connected by any suitable coupling means. Rotation of the motor 127 produces rotation of the spherical head 14 about the pivots 89, hereinafter referred to as the pitch axis, through the shaft 124, gears 125, 110, shaft 78, pinion and sector gears 81, 33 and semicircular ring 25; while rotation of the motor 126 produces rotation of the spherical head 14 about the pivots 26, hereinafter referred to as the yaw axis, through the shaft 122, gears 123, 112, shaft 85, gears 86, 87 and bracket 88.

In order to limit the relative movement of the spherical head about either of its axes of rotation and to avoid damage to the device, limit switches are associated with the mechanical couplings of the drive motors to interrupt the motor circuit just prior to the spherical head reaching its mechanical limit of rotation. While the placement of these limit switches is of little importance, it appears expedient to associate these switches with the shafts directly connected to the motors. On each of the shafts 122, 124 are cam member 130, 131 respectively, that are welded or otherwise securely fastened to the respective shaft. For a better understanding of the arrangement of the cam member and the limit switches, reference is made to Fig. 3 wherein for the purpose of illustration just the limit switches as are associated with the motor 127 are shown and will be described since the arrangement for both motor circuits is the same. The cam 131 has a single raised node 132 that is positioned between switch actuating arms 133 and 134 of a normally open switch 135 and a normally closed switch 136, respectively.

A better understanding will be had of the circuit arrangement of each control motor by reference to Fig. 4 wherein a circuit for only one drive motor is shown in that the circuit for each drive motor is the same. Using the drive motor 127 for the purpose of explanation, this drive motor is represented electrically by the same reference character and as having a field winding 140 for clockwise rotation of the motor, looking forwardly over the motor as illustrated in Fig. 1, and a field winding 141 for counterclockwise rotation. The field windings join, as is conventional with this type motor, into conductor 142 connected to a voltage source. Field winding 140 is connected through conductor 143 to one arm 144 of a two-blade relay switch, generally referred to by the reference character 145. The other end of the field winding 141 is connected by conductor 146 to the other switch arm 147 of the relay switch 145. The stationary poles of the relay switch 145 are both connected to ground through conductors 148 and 149 respectively, the relay contact arms being biased such that the contact arm 144 is normally closed through the conductor 148 to ground and the contact arm 147 is normally open. The two contact arms 144 and 147 have an armature associated therewith and represented in dotted lines which is influenced by a solenoid coil 150 upon energization to connect arms 147 to contact 149 and break the connection between 144 and 148. One end of the solenoid coil 150 is connected by conductor 151 to a voltage source and the other end is connected through conductor 152 to one pole each of the limit switches 135 and 136. The stationary contact of the limit switch 135 is connected to ground while the stationary contact of the limit switch 136 is connected by conductor 153 to the terminal 61 of contact element 63, the contact 51 on the diaphragm 48 being grounded.

Referring again to Fig. 1, each motor 126, 127 has a rearwardly extending portion of the rotor shaft that is each, respectively, connected to a self synchronous motor transmitter 170, 171 by a coupling 172, 173. These couplings may be of any of the well known types to couple the shafts of the respective drive motor with the self synchonous transmitter motor and is shown merely as a coupling sleeve for securing these shafts. The self synchronous transmitter 170 is electrically coupled to a self synchronous receiver motor 174 by the cable 175, the synchronous receiver shaft being mechanically connected to the indicating hand of a pitch angle indicator 176 to register pitch angles of the aircraft on which the device is used in accordance with the pitch deviation of the aircraft with respect to the air stream. The self synchronous transmitter 171 is electrically coupled by the cable 177 to a self synchronous receiver motor 178 which operates a yaw indicator 179. The rotor windings of the self synchronous transmitters and receivers are supplied by a voltage source as is well known in the art to produce signal intelligence in the system.

For the purpose of assembling the device on a vehicle as an airplane, referring to Fig. 5, a flange 160 that conforms to the surface to which it is to be attached may be riveted or welded to the tubular support 10. To expedite assembly, the tubular support 10 may be divided at 161 and the rearmost section of the tubular support 10 retained on the block 40 by screws in the same manner as the foremost section. It should also be further understood that the spherical head 14 is retained on the spherical seat 13 on the tubular support 10 by reason of the central shaft 85 having the pinion gear 86 bear against the bearing block 29 and the block bear against the semicircular member 27 holding the spherical head rearwardly since the shaft 85 is retained against any forward longitudinal movement by the pinion gear 112 bearing against the roller bearing 111. Where desirable, a sealing ring may be arranged in the spherical seat 13 to seal out dirt and moisture. The spherical head member 14 may be easily and quickly removed from the assembly by loosening one of the set screws 17 that seat in the semi-circular ring sockets 26. The gears 86, 87 and 90 will separate without difficulty. The fluid conduits 66—69 may have couplings as rubber sleeves to facilitate attachment and detachment.

In the explanation of the operation of the device, let it be assumed for the purpose of illustration that the device is installed on aircraft to indicate pitch and yaw angles. The tubular support is preferably mounted by the flange 160 on the leading edge of an aircraft airfoil, nacelle, or fuselage such that the longitudinal centerline of the tubular support is parallel to the longitudinal centerline of the aircraft and the spherical head is in the free airstream. The pitch and yaw indicators 176 and 179 together with their respective synchronous receiver motors are installed on the instrument panel of the aircraft as is conventional. When the sensing head axis of symmetry is aligned with the longitudinal centerline of the aircraft, the pitch and yaw indicators will read zero as illustrated in Fig. 1. As the aircraft takes off the runway, the pitch and yaw device is turned on for operation. The circuit is immediately established to cause motor 127 to rotate clockwise to effect counterclockwise rotation of the sensing head 14. The pressure in the sphere head port 100 becomes greater than the pressure in port 101 due to the inclination of the aircraft for take-off which will close contacts 51, 63 placing the relay coil 150 in a closed circuit to switch the contact arms 144 and 147 to the lower position and causing rotation of the turn motor 127 in the counterclockwise direction, looking in the forward direction of the device, which will cause rotation of the spherical head clockwise until the pressure in ports 100 and 101 are equal whereupon the circuit through the relay coil is broken at 51, 63. The circuit will then be completed through the reversing motor field winding 140 to cause counterclockwise rotation of the spherical head 14. In actual practice, one of the field windings 140 or 141 are constantly energized to cause oscillation of the spherical head 14 about its pitch axis to maintain equal pressures in the ports 100 and 101. This oscillation, however, is extremely slight—so slight in actual practice that the movement of the spherical head is not perceptible to the eye or to the touch. This oscillation can be increased by withdrawing the contact 63 from the contact 51 but the greater precision is reached when the clearance is adjusted to a minimum at a time when no forces are acting on the diaphragm 49.

The consequent operation of the pitch indicator 176 is to register in degrees of upward pitch the aircraft is assuming with respect to the flowing airstream. The greater the spherical head 14 must be rotated clockwise to provide equal pressure in the ports 100 and 101, the greater will be the upward registration in degrees on the pitch indicator 176. It may be readily seen that downward pitch angles may be indicated as readily as upward pitch angles by the device.

The useful range of pitch angles is from zero to about 15 degrees and therefore the instrument is built to cover a 20 degree range which would provide ample pitch angles for all conditions for flying. If for any reason the spherical head 14 is driven to approach one of its limits of rotation, the cam node 132 will operate one of the limit switches to reverse the direction of the turn motor. For example, in the event the spherical head 14 is being rotated clockwise approaching its mechanical limit, as viewed in Fig. 1, the switch 136 will be opened (see Fig. 3) and the relay 145 de-energized to connect the field winding 140 to rotate the drive motor and shaft 124 clockwise and the shaft 78 and spherical head 14 counterclockwise until the cam node 132 permits the switch 136 to again make contact. The turn motor will oscillate to make and break the contacts of limit switch 136 as long as the unusual pitch angle condition exists.

Control of the spherical head 14 about its yaw axis, or pivots 20, 26, is carried out in the same manner as described for the pitch control. Any unequal pressures in the ports 102, 103, are transmitted through the fluid conduits 67, 68 to opposite sides of the diaphragm 48 wherein the contacts 50, 62 are conditioned to make or break the circuit in the coil of relay 145' which relay controls the direction of the drive motor 126 to rotate the spherical head 14 to null or equalize the pressure in ports 102, 103. The self synchronous transmitter-receiver system 171, 178 is effective to transmit the angular position right or left of the sphere axis of symmetry with respect to the longitudinal centerline of the tubular support through the control shafts and thus register on the yaw indicator 179 the position of the longitudinal reference line of the aircraft with respect to the relative airstream. The angular deviation in either the right or left direction is limited by limit switches in a maximum of 20 degrees in the same manner as the pitch angulation is limited. While mechanical relays 145 and 145' are shown and described for the circuit, it is to be understood that electronic relays may be used, and in actual practice are used, to provide superior control and reduce "hunting" in the system. For the purpose of illustration the sensing head member 14 is shown and described as being spherical, which provides good aerodynamic results for subsonic speeds, but the sensing head may take other forms to adapt the device for use at transonic and supersonic speeds.

It is believed to be further understood that both of these pitch and yaw operations take place simultaneously such that simultaneous registration of both the pitch and yaw angles are available to the aircraft flight personnel. The two indicators may be made as one instrument, where desirable or feasible, such that both indications may be read from a single dial.

From the foregoing it may be understood that various changes and modifications may be made in the structure and details without departing from the spirit and scope of this invention and I desire to be limited only by the scope of the appended claims.

I claim:

1. A universally mounted sensing head for null pressure type pitch and yaw indicating devices comprising; a tubular boom having a spherically concave open end; two concentric shafts consisting of an outer tubular shaft and an inner solid shaft, the outer tubular shaft of which is journaled in said boom and terminates in a pinion gear in the spherically concave portion of said boom and the inner solid shaft is journaled in said tubular shaft and terminates in a pinion gear outwardly from said tubular shaft pinion gear; a cup-shaped sensing head having the perimeter of the opening thereof spherically convex slidably interfitting the spherically concave open end of said boom; a semicircular ring member having its end portions journaled to the inner wall of said sensing head on an axis perpendicular to an axis of symmetry of said sensing head, said semicircular ring member being divided at its mid portion through which divided portion said solid shaft extends, a bearing member retained between the inner radial surface of said semicircular ring member and said pinion of the solid shaft, and said semicircular ring member having a sector gear in mesh with the pinion gear of said tubular shaft; a bracket having its ends journaled to the inner wall of said sensing head on an axis perpendicular to said axis of symmetry and the axis formed by the journals of said semicircular ring member and having a sector gear thereon in mesh with said pinion gear of said solid shaft; means providing two pairs of pressure ports arranged in said sensing head on the side remote from the concave open end of said boom and being symmetrically positioned about said axis of symmetry in planes corresponding to the two sensing head axes of rotation, a pair of pressure responsive motor controlling devices in pressure communication respectively with said two pairs of pressure ports, a pair of drive motors connected respectively to said tubular shaft and said solid shaft and each responsive to one of said pairs of pressure responsive motor controlling devices to maintain the corresponding pairs of pressure ports in equal pressure relation through said concentric shafts and whereby rotation of said tubular shaft rotates said sensing head about its axis formed by the bracket journals and rotation of said solid shaft rotates said sensing head about its axis formed by the semicircular ring member journals to provide angular sense of said sensing head axis of symmetry with respect to the airstream in both the vertical and horizontal planes.

2. In a differential pressure null type pitch and yaw control device having a universally mounted sensing head sensitive to flow characteristics in the vertical and horizontal planes comprising; a hollow truncated spherical sensing head with an opening into said sensing head at the truncated plane, said head having two sets of ports in normally arranged planes symmetrical about an axis of symmetry of said sensing head and in the hemisphere removed from the truncated hemisphere; two brackets having the ends thereof journaled to the inner surface of said sensing head, each being journaled along a diameter of said sensing head in a plane of each of the corresponding sets of ports, the plane through the journals of both said brackets being normal to the sensing head axis of symmetry, and each bracket having a sector gear thereon and centrally thereof rotatable in a plane parallel with the plane passing through the journals of the corresponding bracket and the plane of the axis of symmetry; a boom adaptable to be mounted in an air flow region and having a spherically concave open end receiving the truncated hemisphere of said sensing head in a manner that said sensing head opening is directed into said boom; means for retaining said sensing head against the concave surface of said boom to permit limited universal rotative movement of said sensing head with respect to said boom; two pressure responsive drive motor controlling means in said boom each in fluid communication with one each of said sets of ports; two drive motor shafts journaled in said boom, each having a pinion gear thereon in mesh with one each of said bracket sector gears whereby rotation of one of the drive motor shafts produces rotation of said sensing head about a diametrical axis effected by the journals of one of said brackets and rotation of said other drive motor shaft imparts rotation of the sensing head about a diametrical axis effected by the journals of the other of said brackets, simultaneous rotation of said drive motor shafts producing universal rotary movement of said sensing head, and two drive motors connected respectively to said two drive motor shafts and being responsive for operation to said two pressure responsive drive motor controlling means.

3. In a differential pressure null type pitch and yaw control device as set forth in claim 2 wherein said two sets of ports constitute two pairs and the fluid communication between corresponding pairs of ports and pressure responsive drive motor controlling means is effected through flexible tubing.

4. In a differential pressure null type pitch and yaw control device as set forth in claim 2 wherein said means for retaining said sensing head on said boom is effected by one of said brackets being semicircular and divided in the central portion thereof through which divided portion one of the drive motor shafts extends and is retained from separation by the pinion gear of said last mentioned drive motor shaft.

5. In a differential pressure null type pitch and yaw control device as set forth in claim 4 wherein said two drive motor shafts are concentric shafts consisting of an inner shaft and an outer tubular shaft the inner shaft of which extends through the divided portion of said semicircular bracket.

6. A differential pressure null type pitch and yaw indicating device comprising; a support for attachment to a mobile vehicle in free airstream relation, a hollow sensing head, means for universally mounting said sensing head on said support including two bracket members having the ends thereof pivoted to the inside surface of said sensing head in a plane normal to an axis of symmetry of said sensing head with the pivots of one bracket being separated by a right angle from the pivots of the other bracket to provide two normally arranged axes of rotation for said sensing head, one of said axes constituting a pitch axis and the other constituting a yaw axis, rotatable bearing means on said support to slidably engage a portion of one bracket for rotatable and rockable support thereof on said support about a point at the intersection of said normally arranged axes, means providing two sets of pressure sensing ports on said sensing head in normally arranged planes and symmetrical about an axis of symmetry of said sensing head, two differential pressure responsive control means having pressure communication with the respective sets of ports, and two independently operable means responsive to said two control means respectively to actuate said two bracket members and thereby exercise null position control over said sensing head in response to the pressures at the ports of said two sets thereof.

7. A differential pressure null type pitch and yaw indicating device as set forth in claim 6 wherein said one bracket rotatable and rockable on said support is semicircular and has the central portion thereof divided, and wherein said rotatable bearing means comprises a bearing block received in said divided central portion and engaging the inner radial surface of said semicircular bracket which bearing block is withheld against separation from said support, and the other bracket is disposed substantially within the semicircular bracket whereby rotation of the semicircular bracket about its center imparts rotation of said sensing head about one of its axes of rotation and rotation of said other bracket about a point intermediate its journals with said sensing head imparts rotation of said sensing head about the other of its axes of rotation.

8. A differential pressure null type pitch and yaw indicating device as set forth in claim 7 wherein the bearing block is withheld from separation from said support by a drive motor shaft having a pinion gear on its outer end abutting said bearing block, said drive motor shaft pinion gear being in mesh with a sector gear on said other bracket whereby rotation of said drive motor shaft imparts rotation to said sensing head through said other bracket, and a tubular shaft concentric with said first mentioned shaft and having a pinion gear thereon in mesh with a sector gear on said semicircular bracket whereby rotation of said tubular shaft produces rotation of said sensing head through said semicircular bracket.

GERALD E. MORRIS.

REFERENCES CITED

The following references are of record in the file of this patent:

UNITED STATES PATENTS

| Number | Name | Date |
|---|---|---|
| 2,463,585 | Young | Mar. 8, 1949 |